United States Patent Office.

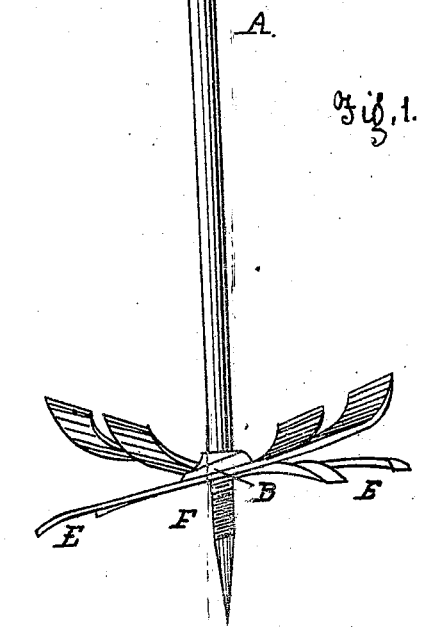
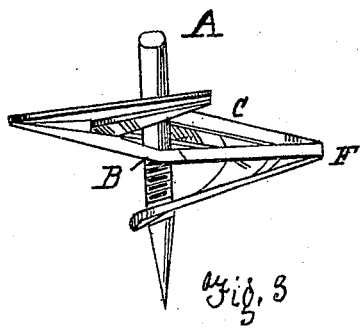
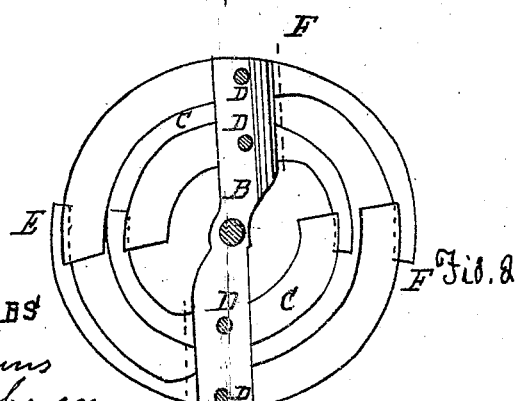

SAMUEL S. SHERMAN AND JEREMIAH G. SHERMAN, OF McHENRY, ILLINOIS.

Letters Patent No. 92,214, dated July 6, 1869.

IMPROVEMENT IN POST-AUGERS.

The Schedule referred to in these Letters Patent and making part of the same.

*To all whom it may concern:*

Be it known that we, SAMUEL S. SHERMAN and JEREMIAH G. SHERMAN, of McHenry, in the county of McHenry, and State of Illinois, have made a new and useful Improvement in Post-Augers; and we do hereby declare the following to be a full, clear, and exact description of the same, reference being had to the accompanying drawings, and the letters and figures marked thereon, which form a part of this specification, and in which—

Figure 1 represents a side elevation of our improved auger.

Figure 2, a top view with the handle removed.

Figure 3, a side view, with a single bit extending around the handle in the shape of a scroll.

The nature of our invention consists in making each cutting-bit of the post-auger in two or more parts, as hereinafter described.

To enable those skilled in the art to manufacture and use our invention, we will proceed to describe the same with particularity.

The same letters of reference refer to the corresponding parts in the different figures.

A represents an ordinary post-auger handle, with the point and screw-thread, for screwing the auger thereto, and B is a cross-piece, to which the auger-bits C are fastened by the bolts or rivets D, and it is secured to the auger-handle by being screwed thereon.

The cutting-edge of the auger-bits C is made in two or more parts, in the form of flat tines, as is clearly shown in figs. 1 and 2 at E, and they may be extended clear round, in two or more parts, each part being riveted to the cross-piece, or they may be brought together at the line F, each bit forming a single piece from that line back.

The object of making the cutting-edge of the bit in separate narrower pieces, is to make an auger that will cut the soil much easier than a continuous cutting-edge, such as is now used, and operate in gravel, which gives it a great advantage over the old form of post-augers.

We do not wish to confine ourselves to a two-bitted auger, such as shown in figs. 1 and 2, for the particular form of the cutting-edge of the auger-bit admits of a thick cut being made, so that a single bit, extending quite round the handle, as shown in fig. 3, works successfully.

Having thus fully described the construction and operation of our improved post-auger,

What we claim, and desire to secure by Letters Patent, is—

A post-auger, with each bit or cutting-edge made in two or more parts, substantially as and for the purposes specified.

SAMUEL S. SHERMAN.
JEREMIAH G. SHERMAN.

Witnesses:
L. L. COBURN,
J. L. COBURN.